United States Patent [19]
Steckling

[11] Patent Number: 5,814,261
[45] Date of Patent: Sep. 29, 1998

[54] MOLDING FIXTURES WITH INTERCHANGEABLE TOOLING PLATES

[75] Inventor: Joseph Steckling, St. Cloud, Minn.

[73] Assignee: Dimension Industries, Inc., Maple Grove, Minn.

[21] Appl. No.: 275,838

[22] Filed: Jul. 15, 1994

(Under 37 CFR 1.47)

[51] Int. Cl.$^6$ .................................................. B29C 33/30
[52] U.S. Cl. ...................... 264/297.6; 425/183; 425/185; 425/188; 425/190
[58] Field of Search ............................ 264/297.6, 297.1; 425/183, 185, 186, 188, 189, 190, 193, 195

[56] References Cited

U.S. PATENT DOCUMENTS

| | | | |
|---|---|---|---|
| 4,191,523 | 3/1980 | Niederst et al. ......................... | 425/195 |
| 4,330,257 | 5/1982 | Rees et al. ............................... | 425/588 |
| 4,519,762 | 5/1985 | Ishihara et al. ......................... | 425/183 |
| 4,664,614 | 5/1987 | De Rossi ................................ | 425/185 |
| 4,691,906 | 9/1987 | Zastrow ................................... | 425/183 |
| 4,744,741 | 5/1988 | Glover et al. ........................... | 425/572 |
| 4,867,668 | 9/1989 | Miyairi ................................... | 425/195 |
| 5,061,164 | 10/1991 | Sabado et al. .......................... | 425/183 |
| 5,230,908 | 7/1993 | Morgan ................................... | 425/183 |
| 5,370,516 | 12/1994 | Brunsman et al. ..................... | 425/183 |
| 5,374,177 | 12/1994 | Hehl ....................................... | 425/190 |
| 5,413,472 | 5/1995 | Dietterich et al. ..................... | 425/183 |
| 5,415,540 | 5/1995 | Prokea et al. .......................... | 425/183 |

*Primary Examiner*—Jill L. Heitbrink
*Attorney, Agent, or Firm*—Jacobson & Johnson

[57] ABSTRACT

A molding fixture for carrying tooling plates that can be interchanged with one another without having to remove the tooling plates from the molding fixture, with the molding fixture having a first platen for supporting a first tooling fixture located on a first frame and a second frame pivotally connected with respect to the first frame to permit movement of the second frame from a closed position to an open position relative to the first frame, with the second frame having at platen-support pod with a first tooling plate and a second tooling plate located on opposite sides of the platen-support pod, with the platen-support pod pivotally mounted in the frame to permit 180-degree pivoting of the platen-support pod with respect to second frame to permit interchanging the location of first tooling plate with the second tooling plate without having to remove either the first or the second tooling plate from the platen-support pod.

17 Claims, 7 Drawing Sheets

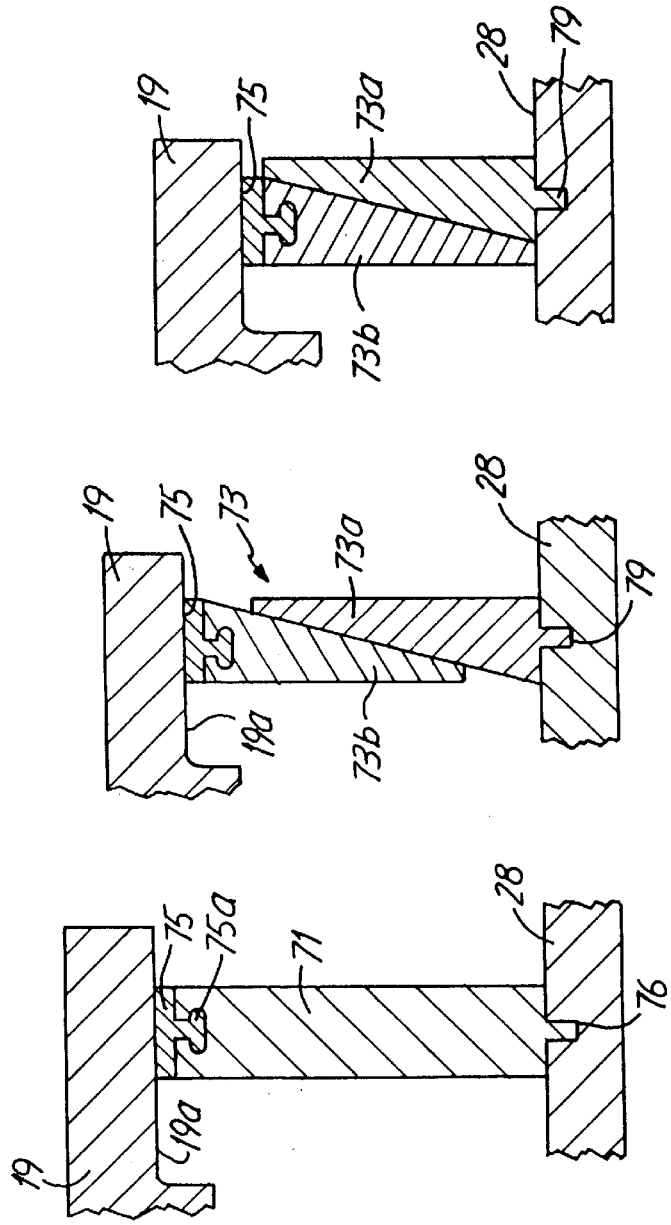

MOLDING FIXTURES WITH INTERCHANGEABLE TOOLING PLATES

FIELD OF THE INVENTION

This invention relates generally to fixtures for molding refrigeration panels and the like and, more specifically, to fixtures having multiple tooling plates with the tooling plates pivotally mounted to permit interchanging tooling plates by rotating the tooling plate support pod 180 degrees.

BACKGROUND OF THE INVENTION

The concept of molding fixtures with tooling plates for use in molding refrigeration panels and the like is well known in the art. Typically, a molding fixture comprises an outer box-like tooling member and an inner similarly-shaped tooling member. The inner tooling member is positioned in a spaced relationship from the outer box-like tooling member to form a cavity therebetween. The cavity is filled with a moldable polymer plastic material to form a shell for use in refrigeration panels or the like. The molding fixtures may be part of an assembly line or permanently mounted. However, from time to time, it is desired to change the tooling to male a different refrigeration panel.

In the prior art, one method of changing tooling has been to physically remove and replace the tooling plates on the molding fixture. Unfortunately, this requires time and tools to enable one to detach the tooling plates and attach new tooling plates to the molding fixtures. The present invention provides an improvement which provides a molding fixture wherein one can quickly interchange the tooling plates located on opposite sides of the molding fixture to permit forming a different molding fixture.

SUMMARY OF THE INVENTION

Briefly, the invention comprises a molding fixture for carrying multiple tooling plates that can be interchanged with one another without the necessity of removing the tooling plates from the molding fixture.

The molding fixture has a first frame and a second frame, pivotally connected with respect to the first frame to permit movement of the second frame from a closed position to an open position relative to the first frame. Located on the second frame is a platen-support pod, with a first tooling plate located on one side of the platen-support pod and a second tooling plate located on opposite sides of the platen-support pod. The platen-support pod is pivotally mounted in the second frame to permit 180 degree pivoting of the platen-support pod to allow interchanging of the first tooling plate with the second tooling plate without the need of removing either the first or the second tooling plate from the platen-support pod.

BRIEF DESCRIPTION OF THE DRAWINGS

FIG. 9 shows a side view of the tooling plate for the lower molding fixture;

FIG. 10 shows a partial sectional view of a tooling plate held in position;

FIG. 11 shows a partial sectional view of an expandable tooling plate in the expanded position; and FIG. 12 shows a partial side view of the tooling plate of FIG. 11 in the contracted position.

DESCRIPTION OF THE PREFERRED EMBODIMENT

Figure 1:
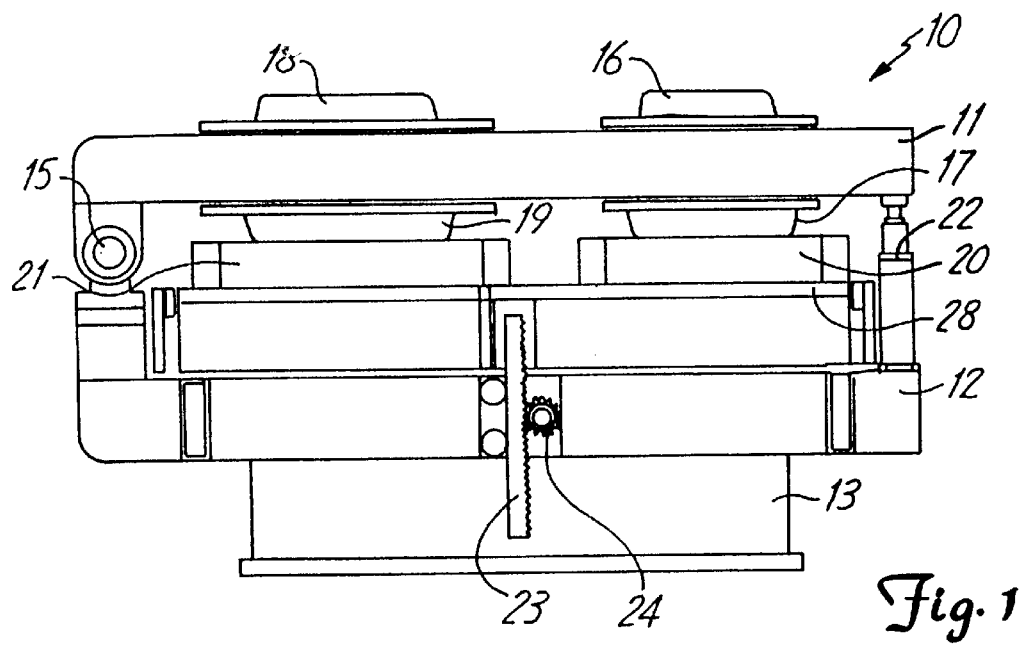
FIG. 1 shows a side-elevation view of the molding fixture with interchangeable tooling plates in a partially closed condition.

FIG. 1 reference numeral 10 generally identifies a molding fixture with interchangeable tooling plates. Molding fixture 10 comprises an upper pivotal frame 11, a lower stationary frame 12 mounted on a pedestal 13. A pivotal shaft 15 connects movable frame 11 to frame 12 to allow pivoting of upper frame 11 with respect to lower frame 12.

Extending outward from upper frame 11 is a first tooling plate 16 and a second tooling plate 18, and extending inward is a third tooling plate 17 and a fourth tooling plate 19. To cushion the closing of the upper frame and lower frame 12, an hydraulic shock absorber 22 is mounted in lower frame 20 and engages upper frame 11 as the upper frame is pivoted to the position shown in FIG. 1. That is, with the present invention the tooling plates on the upper frame needs to be brought in register with the lower tooling plates in typically less than 1 and ½ seconds. To rapidly pivot the upper frame into a position for molding, hydraulic shock absorber 22 absorbs the impact as the upper frame is rapidly brought to the partially closed position as shown in FIG. 1.

Lower frame 12 includes a rectangular plate or platen 28 containing a first lower tooling plate 20 and a second lower tooling plate 21. The molding fixture, as shown in FIG. 1, is in a partially closed position and can be brought to a closed molding position through a rack gear 23 and a pinion gear 24. Although FIG. 1 shows only one rack gear and one pinion gear, additional rack and pinions gears are used to evenly and uniformly push the lower frame up to the upper frame to bring the upper and lower tooling plates in to engagement.

Figure 2:
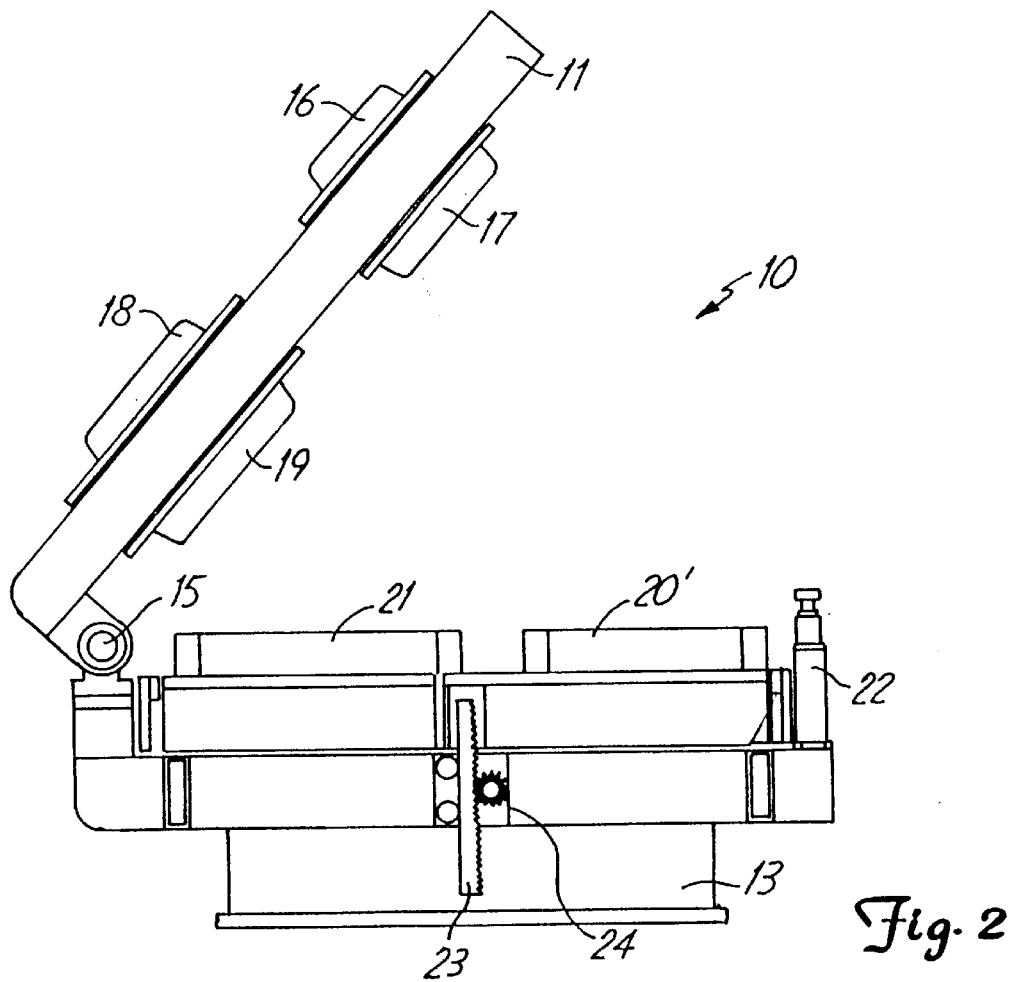
FIG. 2 shows the embodiment of FIG. 1 as the upper frame is swung open.

FIG. 2 shows upper frame 11 rotated upward above shaft 15 and away from lower tooling plates 20 and 21.

Figure 3:
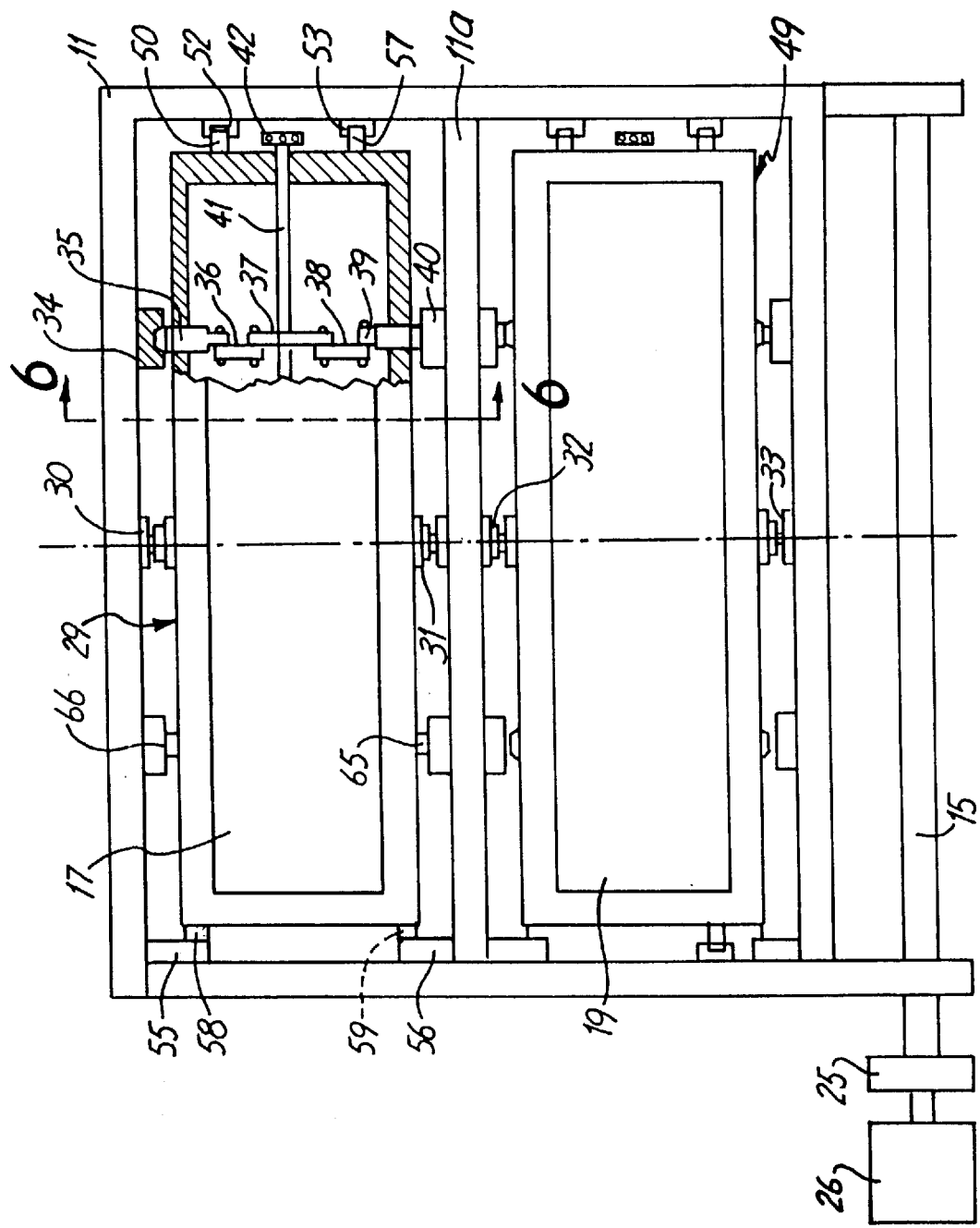
FIG. 3 shows a front-elevation view with a partial cut-away of the upper portion of the molding fixture.

FIG. 3 shows an upper partial elevation view of the upper frame with a first platen-support pod 29 and a second pivotally mounted platen-support pod 49. A partial cut-a-way view of first platen-support pod 29 reveals a mechanisms for aligning and locking platen-support pod 29 in frame 11. Similarly, second platen-support pod 49 is pivotally mounted in frame 11a. That is, reference numeral 30 identifies a first bearing 30 and reference numeral 31 identifies a second bearing 31 which provide for pivoting support of the platen-support pod 29. Similarly, bearings 32 and 33 provide for pivotal support of the platen-support pod 49 which carries lower tooling plates 18 and 19.

Because both of the upper tooling plates and their support mechanisms are identical in operation, this application describes only one. Tooling plate 17 and platen-support pod 29 have been partially cut away to reveal the interior locking mechanisms for aligning and locking the tooling plate in either of two positions. A central shaft 41 runs through a platen-support pod 29 and contains a member 37 which has one end which pivotally connects to link 36. Link 36, in turn, pivotally connects to a retractable alignment pin 35.

Similarly, on the opposite side, member 37 pivotally connects to a link 38 which connects to a second alignment pin 39. Alignment pin 35 engages a mating alignment recess in member 34 which is connected to frame 11, and, similarly, alignment pin 39 engages a mating alignment recess in member 40 which is attached to frame 11a. Similarly, a second set of alignment pins 65 and 66 are located on the other end of platen-support pod 29.

Figure 4:
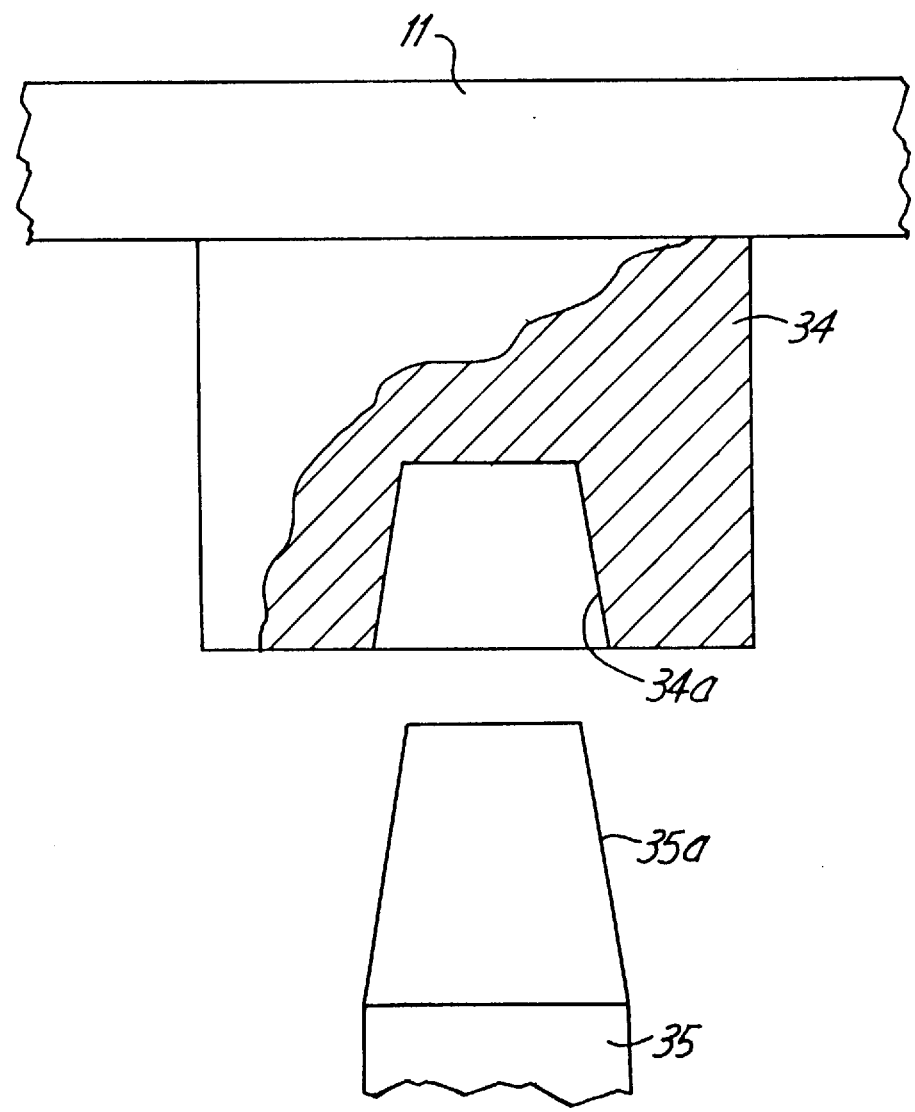
FIG. 4 shows an enlarged view of an alignment pin.

In operation of the alignment pins, shaft 41 can be rotated by a hand wheel 42 having a series of openings therein for insertion of a screwdriver of the like. FIG. 4 shows the detail of alignment pin 35. Alignment pin 35 has an alignment surface 35a for engaging a recess 34a in member 34 which is attached to frame 11. This ensures precise alignment of the platen-support pod 29 with frame 11.

Similarly, alignment pin 39 engages member 40 to hold the opposite side of pod 29 in position. The second set of alignment pins 65 and 66 are located an equal distance in the opposite side of the centerline $C_L$ so that 180-degree pivotal rotation of platen-support pod 29 allows one to use alignment pin 66 to engage member 34 and vice versa. Similarly, the 180-degree rotation of platen-support pod 29 allows one to use alignment pin 65 to engage member 40 and vice versa. Thus, with the present invention, one can rotate the pod 180 degrees and automatically have precise alignment of the tooling plates with the support frame 11 through the coaction of precision-mounted alignment-receiving members on frame 11 and alignment pins on pod 29.

Figure 5:
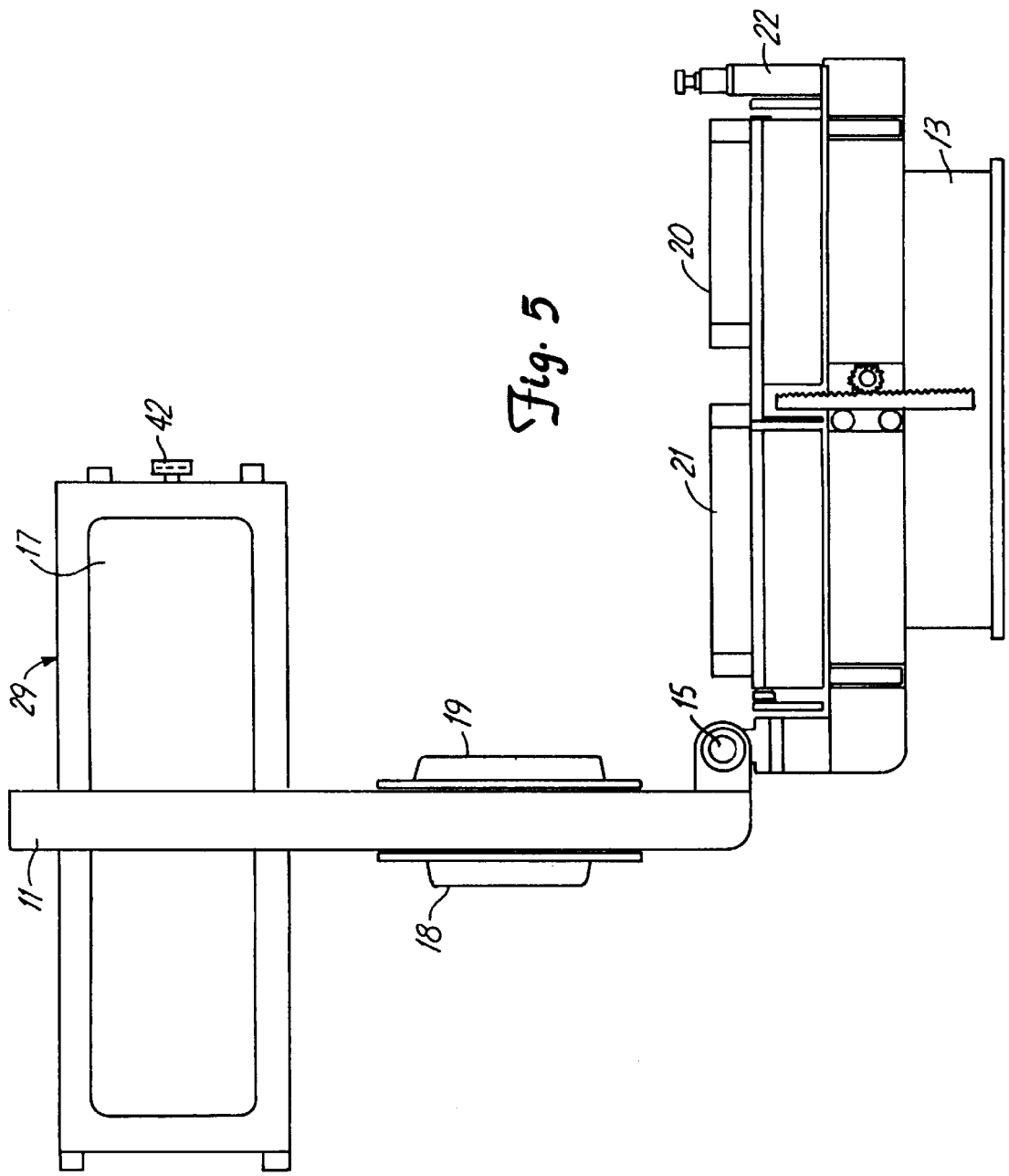
FIG. 5 shows a side-elevation view with a pivotal pod and tooling plates.

FIG. 5 shows the molding fixture in an upright position with the process of flipping the platen-support pod 29 from one side to the other to thereby reverse the position of the tooling plates by bringing the tooling plate 16 on top of the frame into position where it can be mated with a tooling plate on the lower platen.

FIG. 3 shows that located on one end of platen-support pod 29 are stops 52 and 53 for engaging extensions 50 and 57 on frame 11 and, similarly, on the other end are stops 55 and 56 for engaging extension members 55 and 59 on pod 29. The stops prevent complete rotation of pod 29 in frame 11 to prohibit twisting of any hoses connected to pod 29, yet permit 180-degree rotation of the platen-support pod 29 from a position where tooling plate 16 is taken from a non-use position on top of frame 11 to a use position in frame 11. This allows flipping of the tooling plate located on the back side of the tooling support to the front side so that it can be engaged with the lower fixture.

Figure 6:
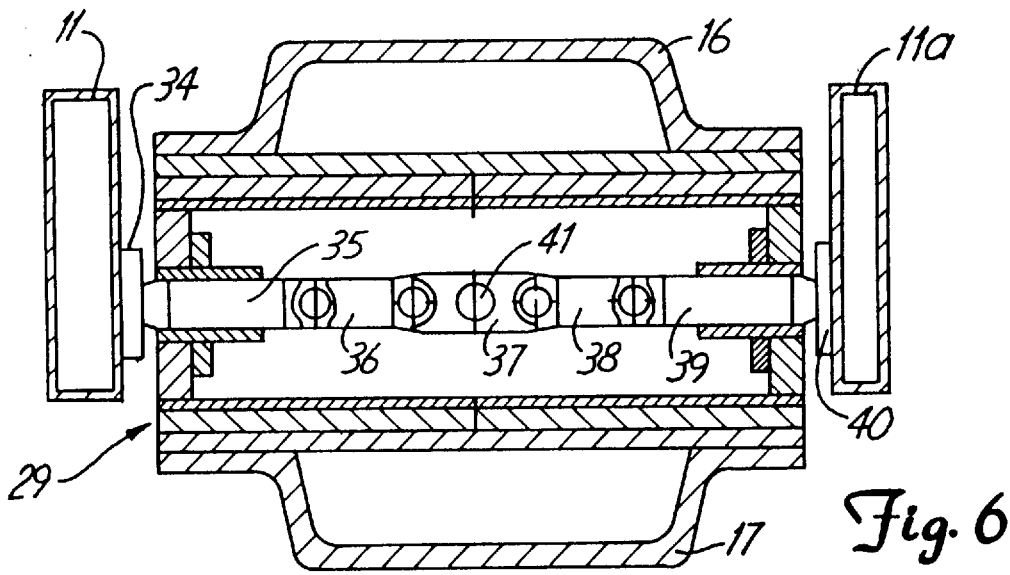
FIG. 6 shows the mechanism for locking the pivotal pod and tooling plates in the locked position.
Figure 7:
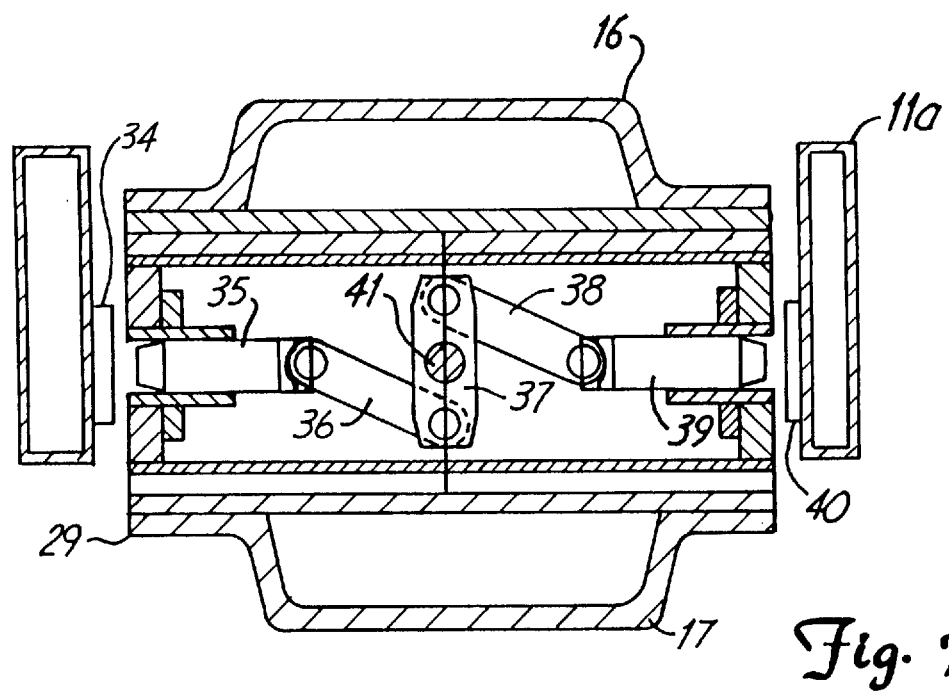
FIG. 7 shows the pivotal pod in the unlocked position.

FIGS. 6 and 7 show alignment pin 35 engaging member 34 and alignment pin 39 engaging member 34 in greater detail to reveal withdrawal or engagement of the pins with members 34 and 40 on frame 11 to accurately position pod 29 with tooling plates 16 and 17 with respect to frame 11.

FIG. 6 shows the tooling-plate support fixture with alignment pins 35 and 39 engaged to prevent one from flipping the tooling plate and FIG. 7 shows the tooling-plate support fixture with alignment pins 35 and 39 disengaged to permit one to flip platen-support pod 29 over so that tooling plate fixture 16 can be used. FIG. 5 shows the platen-support pod 29 being rotated from one side to the other. The platen support pod is balanced such that the center of gravity is close or on the center line $C_L$ to enable the platen support pod to be pivoted with little effort.

Figure 8:
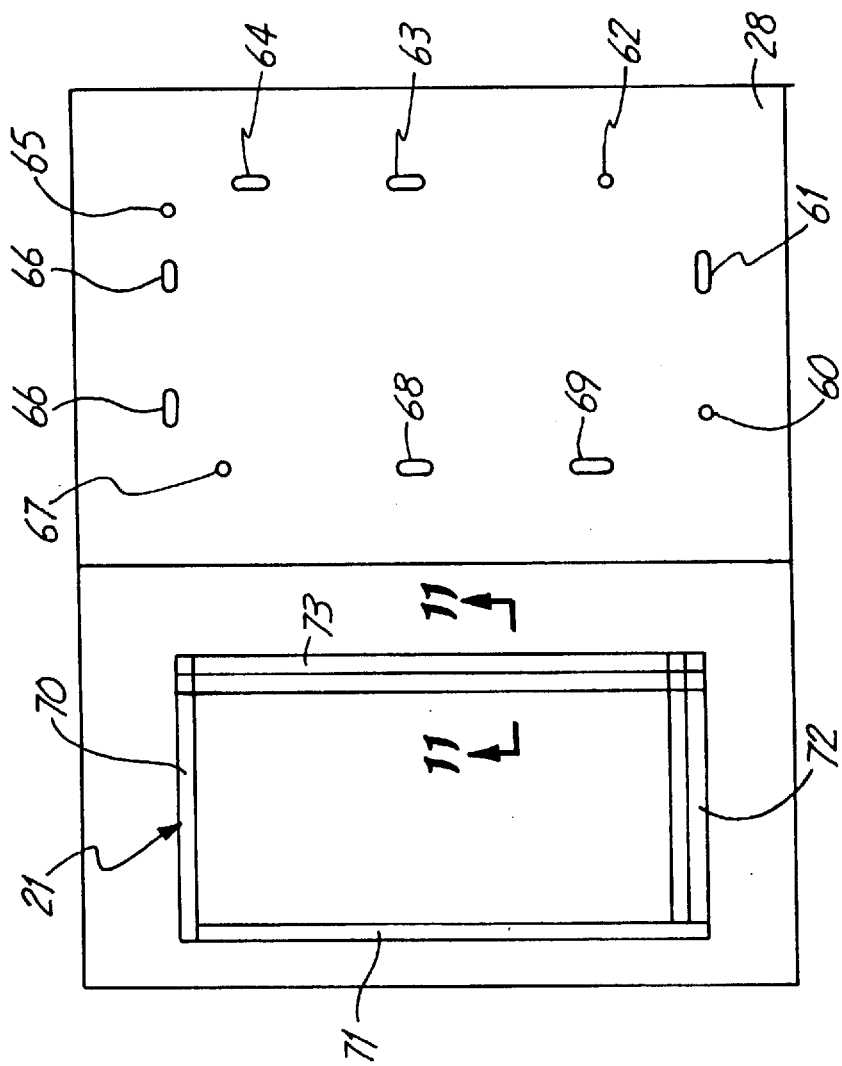
FIG. 8 shows a top view of a platen of the lower molding fixture.

FIG. 8 shows a top view of the lower frame platen-support plate 28 for supporting the lower tooling plates 20 and 21. Tooling plate 20 has been removed to reveal the location of holes for supporting tooling plate 20. Platen 28 has a first cylindrical hole 62 and in alignment therewith, are elongated slots 63 and 64. Located at a right angle to cylindrical hole 62 and elongated slots 63 and 64 is a cylindrical opening 65 and cylindrical slots 66. Located parallel to first cylindrical hole 62 and elongated slots 63 and 64 is a cylindrical opening 67 and elongated slots 68 and 69. Located at a right angle to cylindrical hole 62 and elongated slots 63 and 64 is a cylindrical opening 60 and cylindrical slot 61. The purpose of having a single cylindrical opening is to provide a locating member in two mutual perpendicular axis, and the purpose of the elongated is to provide alignment in one axis and provide for motion in other axis to accommodate the lengthening and shortening of the member due to thermal expansion and contraction of the individual members of tooling plate 70.

The tooling plate is shown on platen member 28 as comprising a first rectangular member 71, a second rectangular member 70, a third rectangular member 72 and a fourth rectangular member 73, which are arranged in a box-like fashion for receiving upper tooling plate 19 on the upper frame 11. To appreciate the positioning and securing of lower tooling plate 21, refer to FIG. 9 which shows tooling plate member 71 having a series of cylindrical guide pins 76 extending from the lower portion thereof. Located on the top of tooling plate member 71 is frictional compression member 75. Member 75 extends along the top portion of member 71. As previously mentioned, cylindrical guide pins 76 engage the sidewalls of cylindrical hole 67 to provide two dimensional positioning while the sidewalls of elongated slots 68 and 69 coact with other guide pins 76 to permit displacement in the direction along the length of member 71 but not permit lateral motion of member 71. Thus it can be appreciated that member 71 provides for maintaining the laterally position of the tooling member yet permits thermal expansion by allowing the cylindrical guide pins 76 to move in the elongated slot.

FIG. 10 shows details of the top and bottom support of the tooling platen member 71 through coaction of upper tooling plate 19 and platen 28. That is, guide or location pins 76 engage platen 28 to prevent lateral expansion or movement of the lower portion of member 71, while the upper portion of platen member 71 contains a friction member 75 comprised of a polymer plastic material which has a top surface which engages surface 19a of member 19 and a lower protrusion 75a that locks into plate 71. Through application of pressure on tooling plate 19, one provides a frictional contact between surface 19a and member 75 to prevent lateral motion of the top portion of member 71 to thus hold member 71 in the vertical, upright position during the molding process.

A further feature of the invention is that, to permit removal of the tooling members from the molding panel, at least two of the tooling members are provided with expandable tooling members. FIG. 11 shows expandable tooling member 73 comprises a first wedge-shaped member 73a and a second wedge-shaped member 73b. The lower portion of wedge-shaped member 73a has a guide pin 79 for aligning and holding it in platen 28. A set of springs, slots and guides (not shown) maintains plates 73a and 73b in sliding proximity to one another.

FIG. 11 shows a frictional member 75 engaging surface 19a. As member 19 is brought into the closed position for molding, member 73b is forced to slide downward along the interior ramp of member 73a. This moves inner surface of member 73b into position for molding. When the molding process is completed and tooling plate 19 is lifted off member 73b, the ramp surface on member 73b allows member 73b to slide upward away from the molded product, thus allowing one to remove the molded product from the lower tooling plate.

I claim:

1. The method of molding different refrigeration panels with the same fixture without having to remove and replace the tooling plates comprising the steps of:

placing a first tooling plate on one side of a platen and a second tooling plate on the opposite side of a pivotable pod;

aligning the first tooling plate with a frame by engaging an alignment pin between the pivotable pod and a support frame;

molding an article using the first tooling plate;

retracting the alignment pin to free the pivotable pod for rotation;

rotating the pivotable pod to bring the second tooling plate into a position for molding a second article; and engaging the alignment pin between the pivotable pod and the support frame to permit molding a second article with the second tooling plate.

2. The method of claim 1 including the step of rotating the pivotable pod 180 degrees.

3. The method of claim 2 including the step of placing a third tooling plate on a second frame to receive the first tooling plate.

4. The method of claim 3 including the step of changing the third tooling plate by removing sections of the third tooling plate and replacing them with sections of a fourth tooling plate for receiving the second tooling plate.

5. A molding fixture for carrying a plurality of tooling plates that can be interchanged with one another without having to remove either of the plurality of tooling members from the molding fixture comprising:

a first frame;

a platen for supporting a tooling fixture located on said first frame;

a second frame, said second frame pivotally connected with respect to said first frame to permit movement of said second frame from a closed position to an open position, said second frame having a platen-support pod, said platen-support pod having a first side and a second side opposite said first side, said platen-support pod having a first end and a second end opposite said first end, said platen-support pod having a first tooling plate attachment face and a second tooling plate attachment face, said platen-support pod having a central axis substantially in alignment with the center of gravity of the platen-support pod;

a first tooling plate located on said first tooling plate attachment face;

a second tooling plate located on said second tooling plate attachment face;

a first pivotal member pivotally connecting said second frame to one side of said platen-support pod;

a second pivotal member pivotally connecting said second frame to said second side of said platen-support pod to permit pivoting of said platen-support pod about said center of gravity, and with respect to said second frame, to interchange the location of the first tooling plate with the second tooling plate without having to remove either the first tooling plate or the second tooling plate from the platen-support pod; and a set of retractable alignment pins for locking said platen-support pod to said second frame to prevent movement of said platen-support pod with respect to said second frame, said retractable alignment pins disengagable with said frame to permit rotation of said platen-support pod in said second frame.

6. The molding fixture of claim 5 including a shaft for simultaneously retracting or engaging said alignment pins.

7. The molding fixture of claim 5 including bearings for pivotally supporting said platen-support pod.

8. The molding fixture of claim 5 including at least two platen-support pods pivotally mounted on said second frame.

9. The molding fixture of claim 5 including a shock absorber for slowing the closing of the second frame with respect to the first frame.

10. The molding fixture of claim 5 including at least four alignment pins on said platen-support pod and four alignment guides on said frame with said alignment guides spaced equidistant from the center line of said platen-support pod so that said platen-support pod can be rotated 180 degrees to enable engagement of the alignment pins with the second frame.

11. The molding fixture of claim 5 including a lower platen and a lower tooling plate for mounting on said lower platen, said lower platen having a cylindrical hole and an elongated slot, said lower tooling plate having a first member with a plurality of cylindrical locating pins for accurately positing said tooling plate on a platen on said second frame with one of said plurality of cylindrical locating pins engaging said cylindrical hole and the other engaging said elongated slot to permit thermal expansion and contraction of said lower tooling.

12. The molding fixture of claim 5 including a lower platen and a lower activated tooling plate for mounting on said lower platen, said lower activated tooling plate having a first member and a second member with mating surfaces that slide with respect to each other to permit lateral movement of the lower activated tooling plate upon closure of the the molding fixture.

13. The molding fixture of claim 11 including a friction member located on said lower tooling plate to permit sandwiching said lower tooling plate between said upper frame and said lower frame to hold s,aid lower tooling plate in position.

14. A molding fixture carrying a plurality of tooling plates that can be interchanged with one another without having to remove either of the plurality of tooling plates from the molding fixture comprising:

a first frame having a first alignment pin receiving member and a second alignment pin receiving member;

a pod having a first side with a first tooling plate and a second side with a second tooling plate located in said frame;

a retractable alignment pin for holding said pod in a first position when said first alignment pin is located in said first alignment pin receiving member on said first frame to locate said first tooling plate in a position for molding an article;

a bearing pivotally supporting said pod to permit rotating of said pod between a first position and a second position where said alignment pin can engage said second alignment pin receiving member in said frame to locate said second tooling plate into a position for molding an article.

15. The molding fixture of claim 14 including a second alignment pin receiving member in said frame with said second alignment pin receiving member operable for receiving said alignment pin when said pod is rotated to a position to bring said second tooling plate into a position for molding an article.

16. The molding fixture of claim 14 wherein the pod has a central pivotal axis with the alignment pin receiving members spaced equal distance from said central pivot axis to permit engagement of said alignment pin with either of said alignment pin receiving members to allow 180 degree rotation of said pod to permit either of said tooling plates to be used for molding an article.

17. The molding fixture of claim 14 including a second frame pivotally connected to said first frame with said second frame having a further tooling plate for coacting with said first tooling plate to provide a cavity for molding an article therein.

* * * * *